(12) United States Patent
Gupta et al.

(10) Patent No.: US 8,594,025 B2
(45) Date of Patent: Nov. 26, 2013

(54) METHODS AND APPARATUS FOR DISTRIBUTING CONTENT IN A MULTI-FREQUENCY NETWORK

(75) Inventors: Binita Gupta, San Diego, CA (US); An Mei Chen, San Diego, CA (US); Devarshi Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1288 days.

(21) Appl. No.: 12/060,789

(22) Filed: Apr. 1, 2008

(65) Prior Publication Data

US 2008/0259858 A1 Oct. 23, 2008

Related U.S. Application Data (60) Provisional application No. 60/909,932, filed on Apr. 3, 2007, provisional application No. 60/910,182, filed on Apr. 4, 2007.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| | | | |
|---|---|---|---|
| 7,158,801 B1 | 1/2007 | Muhonen | |
| 2004/0142656 A1 | 7/2004 | Bensimon et al. | |
| 2005/0059409 A1* | 3/2005 | Vare et al. | 455/456.1 |
| 2005/0237960 A1* | 10/2005 | Kim | 370/312 |
| 2008/0259894 A1* | 10/2008 | Gupta et al. | 370/343 |
| 2008/0259911 A1* | 10/2008 | Gupta et al. | 370/356 |

FOREIGN PATENT DOCUMENTS

| | | |
|---|---|---|
| DE | 19735836 | 2/1999 |
| JP | 2001513611 A | 9/2001 |
| JP | 2003078482 | 3/2003 |
| JP | 2007060715 A | 3/2007 |
| WO | WO2006110445 A1 | 10/2006 |

OTHER PUBLICATIONS

International Search Report—PCT/US2008/059312, International Searching Authority—Sep. 25, 2008.
Written Opinion—PCT/US2008/059312, International Searching Authority—Sep. 25, 2008.

* cited by examiner

*Primary Examiner* — Chi Pham
*Assistant Examiner* — Kouroush Mohebbi
(74) *Attorney, Agent, or Firm* — The Marbury Law Group, PLLC (57) ABSTRACT

Methods and apparatus for distributing content in a multi-frequency network. A method includes combining service overheads with a content multiplex to generate service layer multiplexes, determining regions of the multi-frequency network where a service layer multiplex is to be distributed, combining distribution overheads with the service layer multiplex to generate distribution layer multiplexes, and transmitting the distribution layer multiplexes over the regions of the multi-frequency network. An apparatus includes combining logic configured to combine service overheads with a content multiplex to generate service layer multiplexes; determine regions of the multi-frequency network where a service layer multiplex is to be distributed; and combine distribution overheads with the service layer multiplex to generate distribution layer multiplexes. The apparatus also includes output logic configured to transmit the distribution layer multiplexes over the regions of the multi-frequency network.

34 Claims, 8 Drawing Sheets

METHODS AND APPARATUS FOR DISTRIBUTING CONTENT IN A MULTI-FREQUENCY NETWORK

CLAIM OF PRIORITY UNDER 35 U.S.C. §119

The present Application for Patent claims priority to Provisional Application No. 60/909,932 entitled "METHODS AND APPARATUS FOR PROVIDING SERVICE AND FLOW MULTIPLEX IN A MULTIPLE FREQUENCY NETWORK" filed Apr. 3, 2007, and assigned to the assignee hereof and hereby expressly incorporated by reference herein.

The present Application for Patent claims priority to Provisional Application No. 60/910,182 entitled "METHODS AND APPARATUS FOR PROVIDING EQUIVALENT MULTIPLEXES IN A MULTIPLE FREQUENCY NETWORK" filed Apr. 4, 2007, and assigned to the assignee hereof and hereby expressly incorporated by reference herein.

BACKGROUND

1. Field

The present application relates generally to the operation of data networks, and more particularly, to methods and apparatus for distributing content in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of distribution waveform carried over different RF channels in such local areas. Another type of MFN is a vertical multi-frequency network (VMFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

In a typical HMFN, a local operations infrastructure (LOI) comprises transmitting sites that operate to transmit a single distribution waveform over an RF channel in a given local area. In a vertical MFN, multiple RF channels are used to convey multiple distribution waveforms carrying different sets of content in a given local area. In an MFN, content is transmitted on one or more RF channels along with overhead information. The overhead information associated with the content provides control and signaling to receiving devices to allow them to select, receive, and decode desired content on the device.

The overhead information associated with a particular content may be different based on the geographic region where that content is carried. As a result, efficient distribution of content and its associated overhead information over multiple areas and multiple RF channels in a multi-frequency network may become complicated.

Therefore, it would be desirable to have a distribution mechanism that operates to efficiently distribute content and associated overhead information over multiple areas and multiple RF channels in a multi-frequency network.

SUMMARY

In one or more aspects, a distribution system, comprising methods and apparatus, is provided that operates to efficiently distribute content and associated overhead information over a multi-frequency network.

In an aspect, a method is provided for multiplex distribution in a multi-frequency network. The method comprises combining one or more service overheads with a selected content multiplex to generate one or more service layer multiplexes, respectively, and determining one or more regions of the multi-frequency network where a selected service layer multiplex is to be distributed. The method also comprises combining one or more distribution overheads with the selected service layer multiplex to generate one or more distribution layer multiplexes, respectively; wherein the one or more distribution overheads are determined based on the one or more regions, respectively, and transmitting the one or more distribution layer multiplexes over the one or more regions of the multi-frequency network.

In an aspect, an apparatus is provided for multiplex distribution in a multi-frequency network. The apparatus comprises combining logic configured to combine one or more service overheads with a selected content multiplex to generate one or more service layer multiplexes, respectively; determine one or more regions of the multi-frequency network where a selected service layer multiplex is to be distributed; and combine one or more distribution overheads with the selected service layer multiplex to generate one or more distribution layer multiplexes, respectively; wherein the one or more distribution overheads are determined based on the one or more regions, respectively. The apparatus also comprises output logic configured to transmit the one or more distribution layer multiplexes over the one or more regions of the multi-frequency network.

In an aspect, an apparatus is provided for multiplex distribution in a multi-frequency network. The apparatus comprises means for combining one or more service overheads with a selected content multiplex to generate one or more service layer multiplexes, respectively; means for determining one or more regions of the multi-frequency network where a selected service layer multiplex is to be distributed, means for combining one or more distribution overheads with the selected service layer multiplex to generate one or more distribution layer multiplexes, respectively, wherein the one or more distribution overheads are determined based on the one or more regions, respectively; and means for transmitting the one or more distribution layer multiplexes over the one or more regions of the multi-frequency network.

In an aspect, a computer program product is provided for multiplex distribution in a multi-frequency network. The computer program product comprises a machine-readable medium comprising a first set of codes for causing a computer to combine one or more service overheads with a selected content multiplex to generate one or more service layer multiplexes, respectively; a second set of codes for causing the computer to determine one or more regions of the multi-frequency network where a selected service layer multiplex is to be distributed; a third set of codes for causing the computer to combine one or more distribution overheads with the selected service layer multiplex to generate one or more distribution layer multiplexes, respectively; wherein the one or more distribution overheads are determined based on the one or more regions, respectively; and a fourth set of codes for causing the computer to transmit the one or more distribution layer multiplexes over the one or more regions of the multi-frequency network.

In an aspect, at least one integrated circuit is provided that is configured for multiplex distribution in a multi-frequency network. The at least one integrated circuit comprises a first module for combining one or more service overheads with a selected content multiplex to generate one or more service layer multiplexes, respectively; a second module for determining one or more regions of the multi-frequency network where a selected service layer multiplex is to be distributed; a third module for combining one or more distribution overheads with the selected service layer multiplex to generate one or more distribution layer multiplexes, respectively; wherein the one or more distribution overheads are determined based on the one or more regions, respectively; and a fourth module for transmitting the one or more distribution layer multiplexes over the one or more regions of the multi-frequency network.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a distribution system is provided that operates to efficiently distribute content and associated overhead information over a multi-frequency network. In an aspect, the distribution system combines content data and associated overhead information into one or more distribution multiplexes that are delivered over a multi-frequency network. The overhead information comprises service overhead and distribution overhead. The service overhead includes service layer specific control and signaling information associated with the content. For example service overhead includes programming guide data for channels/services carried as part of the content. The distribution overhead includes distribution network specific control and signaling information. For example distribution overhead identifies LOIs and RF channels in a multi-frequency network, provides mapping between RF channels and content flows carried over these RF channels in the multi-frequency network etc. In an aspect, the distribution system identifies equivalent distribution multiplexes which are set of distribution multiplexes which carry identical content data but different service overhead and/or distribution overhead data. The distribution system operates to efficiently transport these equivalent distribution multiplexes over the multi-frequency network by reducing the transmission of redundant information.

The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

DEFINITIONS

The following definitions are used herein to describe aspects of a distribution system.

1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Content—Refers to media data e.g. audio, video, text and any other form of media data.
4. Content Multiplex—Refers to a grouping of content flows.
5. Multiplex Set—Refers to a grouping of content multiplexes.
6. Wide Area Multiplex—Refers to a grouping of content flows that are broadcasted over at least one wide area.
7. Local Area Multiplex—Refers to grouping of content flows that are broadcasted over at least one local area.
8. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
9. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOIs. A LOI may belong to one or more WOIs.
10. RF Channel—Refers to a frequency band that is used to convey a content distribution waveform over a selected LOI.
11. Content Channel—Refers to selected content flows within a particular distribution waveform. For example, a distribution waveform may comprise multiple content channels and each content channel may comprise one or more content flows.

ACRONYMS

The following acronyms are used herein to describe aspects of a distribution system.
LM—Local Area Multiplex
WM—Wide Area Multiplex
NOC—Network Operations Center
LOI—Local Operations Infrastructure
WOI—Wide Operations Infrastructure
VM—Vertical Multiplex
VMFN—Vertical Multiple Frequency Network
HMFN—Horizontal Multiple Frequency Network

INTRODUCTION

Figure 1:
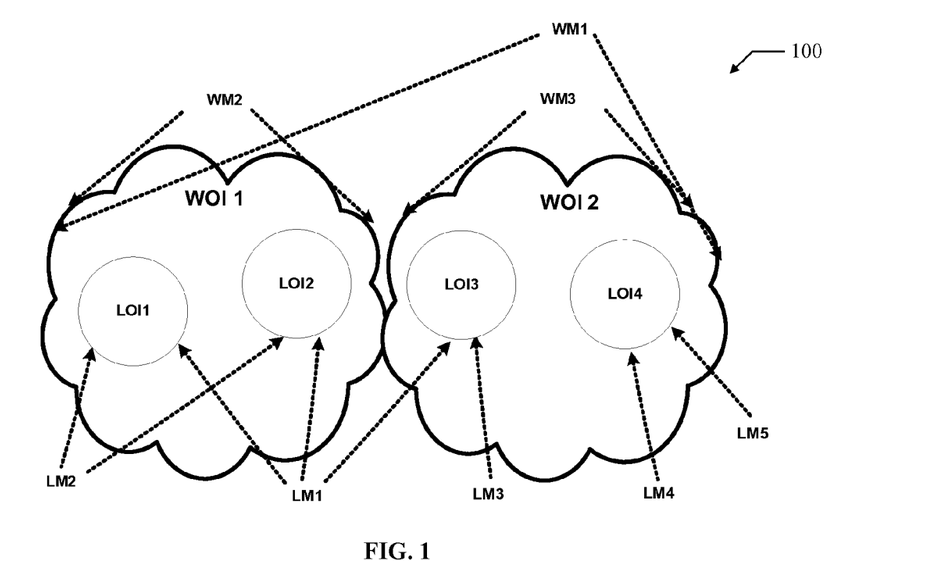
FIG. 1 shows a network that illustrates the distribution of content multiplexes over two wide area regions of a multi-frequency network.

FIG. 1 shows a network 100 that illustrates the distribution of wide and local content multiplexes over two wide area infrastructures (WOI1 and WOI2). For example, a first wide area multiplex (WM1) is distributed over both WOI1 and WOI2. The WOI1 comprises LOI1, and LOI2. The WOI2 comprises LOI3 and LOI4. A second wide area multiplex (WM2) is also distributed over the WOI1 and a third wide area multiplex (WM3) is distributed over the WOI2. In addition, a first local area multiplex (LM1) is distributed over the LOI1, LOI2 and LOI3, a second local area multiplex (LM2) is distributed over LOI1 and LOI2, and a third local area multiplex (LM3) is distributed over LOI3. Furthermore, a fourth local multiplex (LM4) and a fifth local multiplex (LM5) are distributed over LOI4. It will be assumed that each LOI shown in FIG. 1 utilizes at least two RF channels to broadcast wide and local multiplexes over each associated local region.

Figure 2:
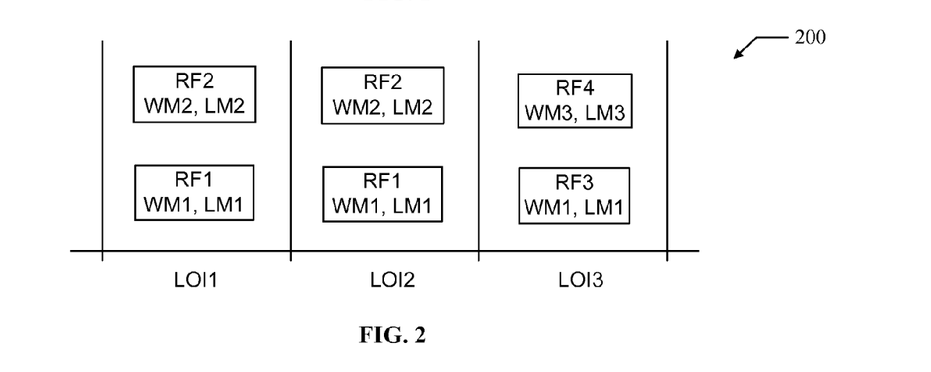
FIG. 2 shows a diagram that illustrates how content multiplexes illustrated in FIG. 1 are allocated to RF channels utilized by three LOIs.

FIG. 2 shows a diagram 200 that illustrates how content multiplexes illustrated in FIG. 1 are allocated to RF channels utilized by three LOIs. For example, the RF channels utilized by LOI1, LOI2 and LOI3 are shown in the diagram 200. The LOI1 and LOI2 utilize a first RF channel (RF1) and a second RF channel (RF2) to carry content and associated overhead information. The LOI3 utilizes the third RF channel (RF3) and a fourth RF channel (RF4) to carry content and associated overhead information.

Each of the RF channels carries one or more multiplexes that convey selected content and/or services to devices in their respective areas. For example, it will be assumed for this description that in LOI1 and LOI2 the channel RF1 conveys (WM1, LM1) and RF2 conveys (WM2, LM2), and in LOI3 the channel RF3 conveys (WM1, LM1) and the channel RF4 conveys (WM3, LM3). It should be noted that depending upon the geographic region and also the associated vertical multiplex set, overhead information associated with a content multiplex may be different. A vertical multiplex set (VM set) is defined as a unique combination of content multiplexes carried in a LOI. VM sets are defined separately for wide and local content multiplexes. The same VM set can be carried in multiple LOIs as well. In FIG. 2, LOI1 and LOI2 carry same wide VM set (WM1, WM2) and same local VM set (LM1, LM2), LOI3 carries wide VM set (WM1, WM3) and local VM set (LM1, LM3). Thus, in FIG. 2 the overhead information associated with WM1 in LOI2 may be different from the overhead information associated with WM1 in LOI3 because of different geographic regions and different associated wide VM sets in these regions. Note that overhead information associated with WM1 consists of service overhead and distribution overhead.

Figure 3:
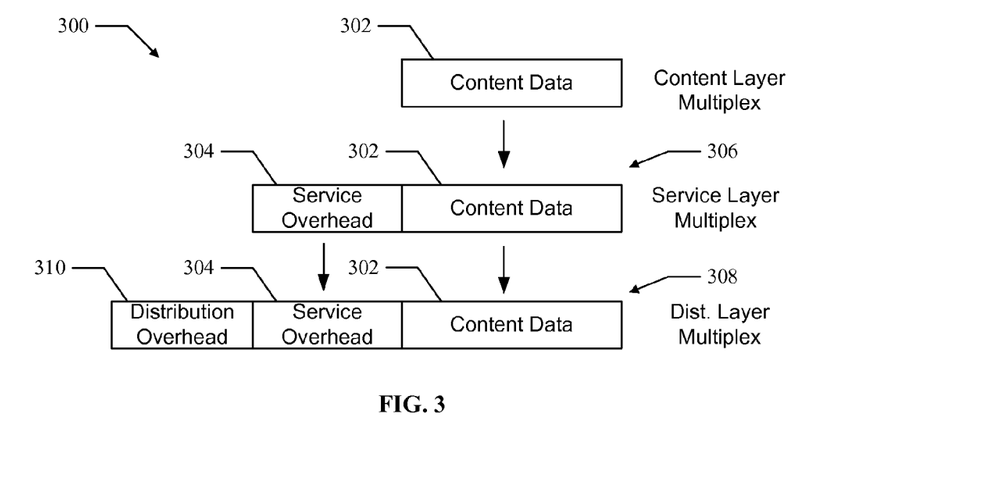
FIG. 3 shows a diagram that illustrates the generation of a service layer multiplex and a distribution layer multiplex for use in aspects of a distribution system.

FIG. 3 shows a diagram 300 that illustrates the generation of a service layer multiplex and a distribution layer multiplex for use in aspects of a distribution system. Service layer multiplexes and distribution layer multiplexes are generated separately for wide and local multiplexes. In an aspect, content data 302 representing a content layer multiplex is combined with service specific control and signaling information contained in a service overhead 304 to form a service layer multiplex 306. For example, the service overhead 304 provides information that identifies the various content flows available in the content data, and for example, provides programming guide information to enable a user to access the content flows. Service overhead 304 may be different for different regions where a content multiplex is broadcast. For example the programming guide data may be generated in an integrated fashion for all services carried over all multiplexes in a VM set. Hence in FIG. 2 the service overhead associated with WM1 will be different in LOI1 and LOI2, because WM1 is associated with two different wide VM sets in these LOIs.

The service multiplex 306 is combined with distribution network specific control and signaling information contained in a distribution overhead 310 to form a distribution layer multiplex 308. The distribution overhead 310 for example can provide information to identify LOIs and RF channels that are used to distribute the content flows over a multi-frequency network and identify associated descrambling sequences used to decode the content flow and service overhead. The distribution overhead 310 can also provide mapping information between RF channels and content flows carried in a multi-frequency network.

The distribution layer multiplex 308 gets distributed to devices as part of the distribution waveform in the multi-frequency network. As described above, service overhead and distribution overhead associated with a given content multiplex may be different based on geographic regions (LOIs) where that content multiplex in broadcast and associated VM set in those regions. Each unique combination of content data 302, service overhead 304 and distribution overhead 310 forms a distribution layer multiplex. One or more distribution layer multiplexes are generated for each content multiplex, depending upon various service overhead and distribution overhead associated with that content multiplex. Thus, in aspects of a distribution system, one or more distribution layer multiplexes are generated for distribution over a multi-frequency network. In an aspect, all distribution layer multiplexes which are associated with identical content data are identified as equivalent distribution layer multiplexes. For example, distribution layer multiplexes generated for WM1 for distribution in LOI1, LOI2 and LOI3 will be identified as equivalent distribution multiplexes. For every set of equivalent distribution multiplexes, only one instance of content data is transmitted from network operations center (NOC) to transmitter sites to optimize backhaul transmission bandwidth.

Figure 4:
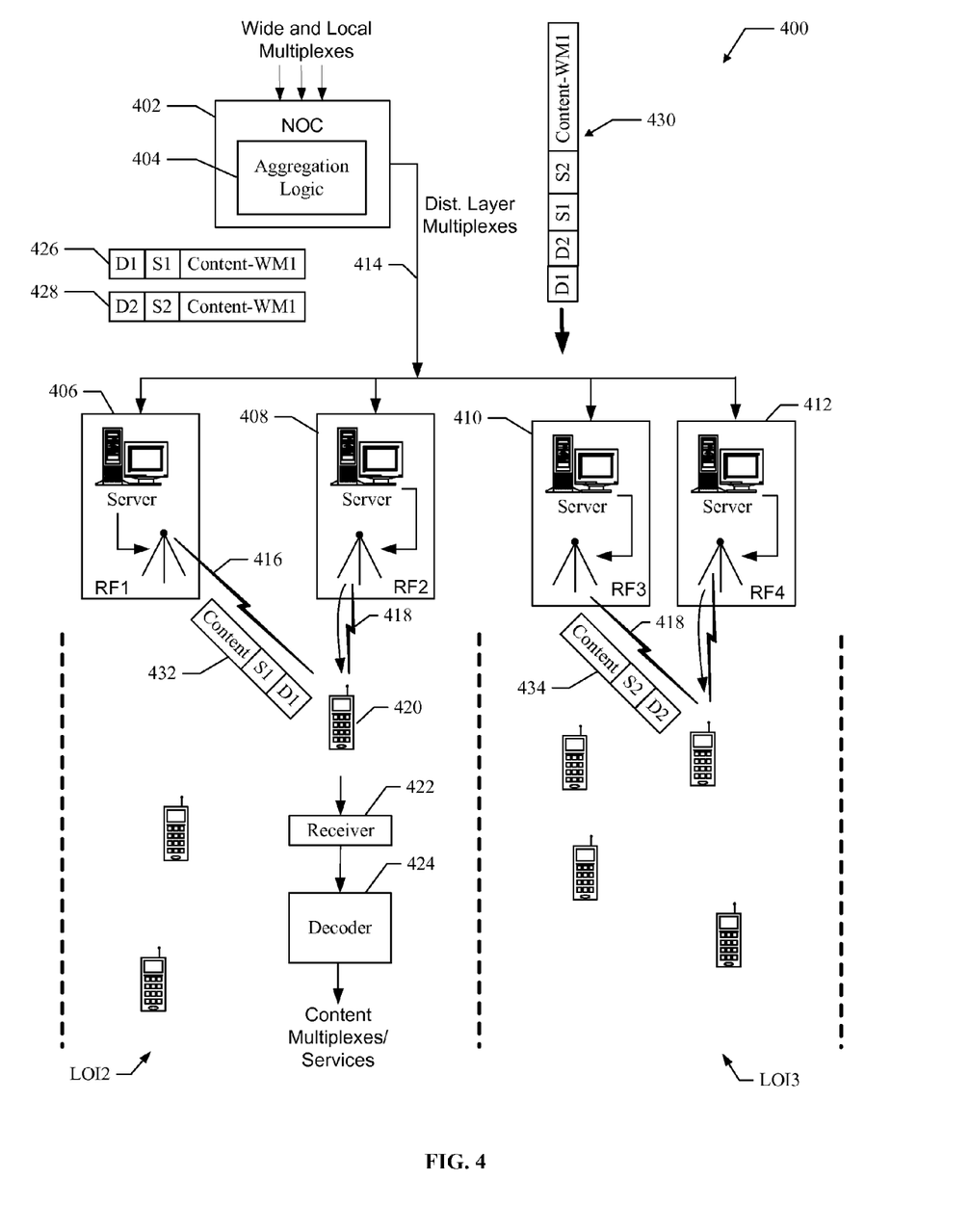
FIG. 4 shows a network that illustrates how distribution layer multiplexes are distributed in aspects of a distribution system.

FIG. 4 shows a network 400 that illustrates how distribution layer multiplexes are distributed in aspects of a distribution system. For example, the network 400 is part of the network 100 shown in FIG. 1. The network 400 comprises a network operations center (NOC) 402, the LOI2, and the LOI3.

The NOC 402 operates to receive wide and local content multiplexes for distribution over selected WOIs and LOIs of a multi-frequency network. The NOC 402 also operates to receive control and signaling information for generating appropriate overhead information associated with wide and local content multiplexes. The NOC 402 operates to configure the multi-frequency network to distribute the content and associated overhead information. To accomplish this, the NOC 402 is aware of the geographic regions of the network, the RF channels used in each region, and any other network information that may be needed to configure the network and distribute the wide and local content multiplexes and associated overhead information.

In an aspect, the NOC 402 comprises aggregation logic 404. The aggregation logic 404 operates to combine selected content multiplexes with associated service overhead information to generate service layer multiplexes. The service overhead identifies service specific control information for example a programming guide, list of subscription packages etc. The service overhead associated with a given content multiplex may be different in different regions that the content multiplex is carried because of different associated VM sets. For example, programming guide data transmitted for content multiplex WM1 (in FIG. 2) may be different for LOI2 and LOI3 because of different associated VM sets in these LOIs. A first integrated programming guide may be transmitted along with WM1 in LOI2 containing service/channel information for multiplexes in the associated VM set (WM1 and WM2) and a second integrated programming guide may be transmitted along with WM1 in LOI3 containing service/channel information for multiplexes in the associated VM set (WM1 and WM3). Based on this, the aggregation logic 404 will create two different service multiplexes for the content multiplex WM1, one for the LOI2 and one for the LOI3. Thus, the aggregation logic 404 operates to generate one or more service layer multiplexes for each content multiplex based on the different set of service overhead information associated with that content multiplex.

The aggregation logic 404 further operates to combine each service layer multiplex with associated distribution overhead information to generate distribution layer multiplexes. The distribution overhead identifies distribution network specific control information, for example a list of RF channels deployed in current and neighboring LOIs, mapping between RF channels and content flows carried on these RF channels, wide and local infrastructure identifiers (WOI and LOI identifiers) and the like. The distribution overhead associated with a given service multiplex may be different in different regions that service multiplex is carried because of different associated infrastructures (WOIs and LOIs) for these regions and different RF channel deployment for these regions. For example, the list of RF channels deployed in current and neighboring LOIs will be different for LOI2 and LOI3. Based on this, the aggregation logic 404 will create two distribution layer multiplexes associated with WM1 for distribution over LOI2 and LOI3, respectively. Thus, the aggregation logic 404 operates to generate one or more distribution layer multiplexes for each service multiplex based on the different set of distribution overhead information associated with that service multiplex. The aggregation logic 404 also operates to identify one or more sets of equivalent distribution layer multiplexes from generated distribution layer multiplexes. A more detailed description of the aggregation logic 404 is provided in another section of this document.

The NOC 402 operates to transmit distribution layer multiplexes to the LOIs in the network 400. It should be noted that although only two LOIs are shown, the NOC 402 may transmit the distribution multiplexes to any number of LOIs.

In an aspect, the LOI2 and LOI3 comprise one or more transmitter sites. For example, the LOI2 comprises transmitter sites 406 and 408 and the LOI3 comprises transmitter sites 410 and 412. Each transmitter site operates to transmit information on a selected RF channel over its respective LOI. For example, the transmitter site 406 transmits information over LOI2 using the RF channel (RF1).

In an aspect, the NOC 402 operates to efficiently transmit the distribution layer multiplexes 414 to the transmitter sites. For every set of equivalent distribution layer multiplexes, the NOC 402 transmits only one instance of content data to transmitter sites to optimize backhaul transmission bandwidth usage. For example, the aggregation logic 404 operates to generate two distribution layer multiplexes (426, 428) for WM1 for LOI2 and LOI3 as shown. The distribution multiplexes 426, 428 are equivalent multiplexes because they are associated with same content multiplex WM1 (Content-WM1) and different service overheads (S1 and S2) and distribution overheads (D1 and D2). The NOC 402 transmits the distribution layer multiplexes 426, 428 to transmitter sites as illustrated at 430. Only one instance of content data component (Content-WM1) is transmitted along with service overhead components (S1 and S2) and distribution overhead components (D1 and D2). Hence, NOC 402 optimizes on backhaul bandwidth required for transmitting distribution layer multiplexes 426 and 428.

The NOC 402 operates to transmit distribution layer multiplexes to transmitter sites using any suitable transport mechanism, as illustrated at 414. Each component (content, service overhead and distribution overhead) of distribution layer multiplexes is assigned a transport identifier for transmission using the selected transport mechanism. For example, in an aspect, the NOC 402 transmits the distribution multiplexes to the transmitter sites using an MPEG-2 transport mechanism 414. In this configuration, each component of distribution multiplexes are assigned MPEG-2 transport identifiers so that each transmitter site can use transport identifiers to detect and receive appropriate components associated with distribution multiplex targeted for transmission in the associated LOI. The distribution overhead, the service overhead and the content data components of a distribution multiplex are assigned different transport identifiers.

In an aspect, servers at the transmitter sites use the transport identifiers to determine which specific components of the distribution multiplexes are intended for them to transmit over their respective LOIs. The servers then operate to pack different components of their respective distribution layer multiplexes into transmission frames for transmission. The servers utilize any suitable physical layer process to pack the distribution layer multiplex components into the transmission frames for transmission.

In an aspect, the transmitter site 406 operates to transmit its transmission frames over the LOI2 using the RF channel (RF1) as shown at 416, and the transmitter site 408 operates to transmit transmission frames over the LOI3 using the RF channel (RF2) as shown at 418. By using multiple RF channels, the network 100 is able to transmit more distribution layer multiplexes over the each LOI. In a similar fashion, the transmitter sites 410 and 412 operate to receive distribution layer multiplexes from the NOC 402 for transmission to devices in the LOI3 using RF3 and RF4. It should be noted that the transmitter sites 406, 408 and 410, 412 may be co-located within their respective LOIs or separated by any desired distance. The servers at the transmitter sites 406 and 410 operate to receive the appropriate distribution multiplex components from the transport layer and transmit these components over their respective LOIs, as illustrated at 432 and 434.

In an aspect, a device 420 comprises a receiver 422 that operates to tune to a selected RF channel in the LOI2 to receive selected transmission frames. For example, the receiver 422 operates to tune to the RF channel (RF1) to receive the transmission frames 416 from the transmitter site 406. The transmission frames that are received comprise distribution layer multiplexes (wide and local distribution multiplexes) generated by the aggregation logic 404.

The receiver 422 passes the received transmission frames to a decoder 424. The decoder 424 operates to decode the distribution layer multiplexes to allow a device user to select and render the associated content multiplexes. For example, the service overhead is used to enable a user to select content to be decoded and the distribution overhead is used to enable decoding the selected content. For example, the service overhead includes the programming guide data which is used to select specific service/channel on the device for rendering and the distribution overhead provides content flows to RF channel mapping information and also provides descrambling sequence identifiers associated with RF channels which can be used to decode the selected content.

Therefore, aspects of a distribution system operate to efficiently distribute content and associated overhead information over a multi-frequency network. It should be noted that the network 400 illustrates just one implementation and that other implementations are possible within the scope of the various aspects.

Figure 5:
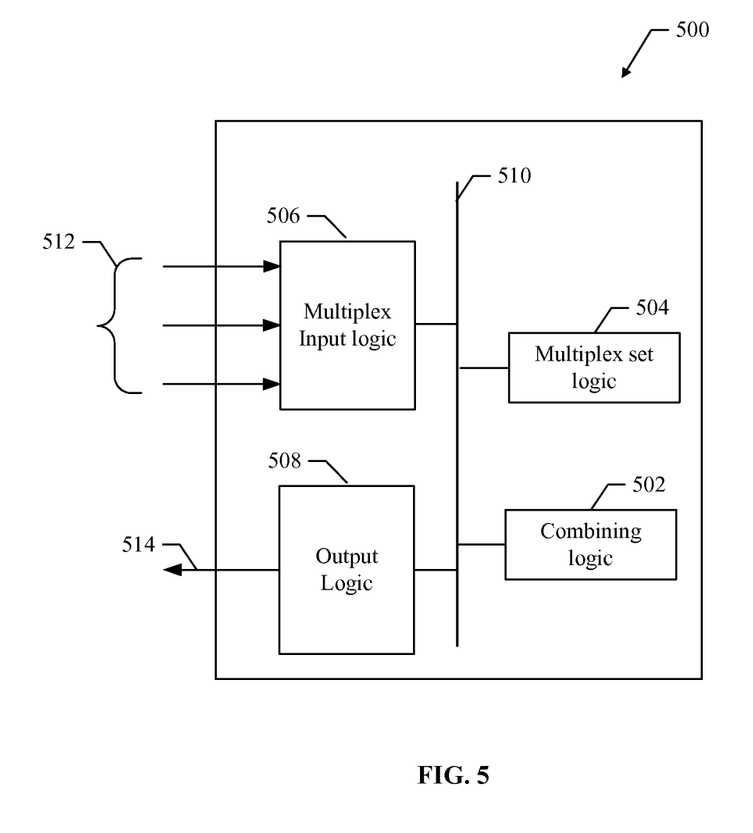
FIG. 5 shows exemplary aggregation logic for use in aspects of a distribution system.

FIG. 5 shows aggregation logic 500 for use in aspect of a distribution system. For example, the aggregation logic 500 is suitable for use as the aggregation logic 404 shown in FIG. 4. The aggregation logic 500 comprises combining logic 502, multiplex set logic 504, multiplex input logic 506, and output logic 508 all coupled to a data bus 510.

The multiplex input logic 506 comprises at least one of a CPU, processor, gate array, hardware logic, memory elements, and/or hardware executing software. The multiplex input logic 506 operates to receive one or more wide and/or local area content multiplexes 512 that are to be distributed over wide and local regions of a multi-frequency distribution network.

The multiplex set logic 504 comprises at least one of a CPU, processor, gate array, hardware logic, memory elements, and/or hardware executing software. The multiplex set logic 504 operates to detect whether received content multiplexes are associated with one or more vertical multiplex sets. In an aspect, a wide area vertical multiplex set comprises all wide area multiplexes that are transmitted in a selected LOI, and a local area vertical multiplex set comprises all local area multiplexes that are transmitted in a selected LOI. In an aspect, if a content multiplex belongs to multiple vertical multiplex sets; it may be associated with different service overhead and distribution overhead information for each multiplex set. The multiplex set logic 504 also operates to detect whether received content multiplexes are carried over one or more infrastructures (WOIs and LOIs). In an aspect, if a content multiplex is carried over multiple infrastructures; it may be associated with different distribution overhead information for each of these infrastructures.

The combining logic 502 comprises at least one of a CPU, processor, gate array, hardware logic, memory elements, and/or hardware executing software. The combining logic 502 operates to determine how content multiplexes are to be distributed in a multi-frequency network. For example, the combining logic 502 utilizes information provided by the multiplex set logic 504 to determine how content multiplexes and multiplex sets are to be distributed over the network. The combining logic 502 operates to determine one or more service overheads and distribution overheads associated with each content multiplex based on associated multiplex distribution information received from the multiplex set logic 504. The combining logic 502 operates to add associated one or more service overhead information to content multiplexes to generate service layer multiplexes. For example, a content multiplex is combined with a service overhead that contains information such as a programming guide that describes the content. The combining logic 502 then adds the one or more associated distribution overhead information to the service multiplex to generate distribution layer multiplexes. The distribution overhead describes the LOIs and RF channels used to transmit the distribution layer multiplex to devices in a multi-frequency network.

In an aspect, the combining logic 502 operates to identify set of equivalent distribution layer multiplexes to be distributed over the multi-frequency network. For example, distribution multiplexes comprising the same content data but different service overhead and distribution overheads are identified as equivalent multiplexes. Once equivalent multiplexes are identified, the combining logic 502 operates to pass this information to the output logic 508. A more detailed description of the operation of the combining logic 502 is provided in other sections of this document.

The output logic 508 comprises at least one of a CPU, processor, gate array, hardware logic, memory elements, and/or hardware executing software. The output logic 508 operates to output distribution layer multiplexes for distribution by transmitters associated with LOIs in a multi-frequency network. For example, the output logic 508 operates to output the distribution layer multiplexes to transmitter sites in a multi-frequency network using any type of transport mechanism.

In an aspect, the output logic 508 operates to assign transport identifiers to the different components of the distribution multiplexes for transmission to the transmitter sites. To optimize backhaul bandwidth usage, the output logic 508 transmits only one instance of content data for each set of equivalent distribution multiplexes. The different service overheads, distribution overheads and the common content data for each set of equivalent multiplexes are then transmitted to the transmitter sites by the output logic 508 using any selected transport mechanism.

In an aspect, the distribution system comprises a computer program product comprising one or more program instructions ("instructions") or "sets of codes" stored or embodied on a machine-readable medium, which when executed by at least one processor, for instance, a processor at the combining logic 502, provides the functions described herein. For example, the sets of codes may be loaded into the aggregation logic 500 from a machine-readable medium, such as a floppy disk, CDROM, memory card, FLASH memory device, RAM, ROM, or any other type of memory device or machine-readable medium that interfaces to the aggregation logic 500. In another aspect, the sets of codes may be downloaded into the aggregation logic 500 from an external device or network resource. The sets of codes, when executed, provide aspects of a distribution system as described herein.

Figure 6:
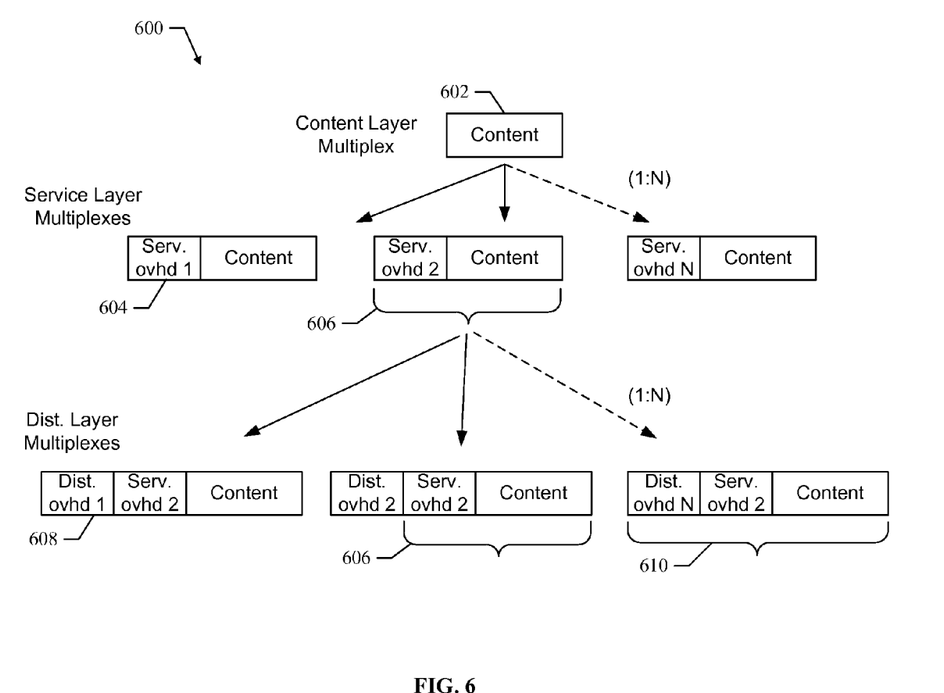
FIG. 6 shows a diagram that illustrates how distribution multiplexes are generated in aspects of a distribution system.

FIG. 6 shows a diagram 600 that illustrates how service multiplexes and distribution multiplexes are generated in aspects of a distribution system. For example, the aggregation logic 500 shown in FIG. 5 operates to generate service multiplexes and distribution multiplexes as illustrated in FIG. 6.

In an aspect, content multiplex data 602 representing a wide or local content multiplex is combined with different service overhead information 604 to produce up to N service layer multiplexes 606. For example, the service overhead of each service multiplex associated with a single content multiplex will be different. The N service layer multiplexes 606 may be distributed over several WOIs/LOIs in a multi-frequency network. In an aspect, the combining logic 502 operates to add the one or more service overhead 604 to the content multiplex data 602 to produce the one or more service layer multiplexes 606.

The service layer multiplexes 606 are combined with distribution overhead information 608 to produce up to N distribution layer multiplexes 610. For example, the distribution overhead of each distribution multiplex associated with a single service multiplex will be different. In an aspect, the combining logic 502 operates to combine a service multiplex with one or more distribution overhead 608 to produce one or more distribution layer multiplexes 610.

It should be noted that different distribution layer multiplexes that are associated with same content multiplex are referred to as equivalent multiplexes and they form an equivalent multiplex set. For example, the distribution multiplexes shown in FIG. 6 are part of equivalent multiplex set because they are associated with same content multiplex 602. The set of all distribution multiplexes associated with every service multiplex 606 which is associated with same content multiplex 602 form a complete equivalent multiplex set. In an aspect, the distribution system operates to efficiently transmit equivalent distribution multiplexes to transmitter sites by transmitting only one instance of content data for all distribution multiplexes in the equivalent distribution multiplexes set to optimize the backhaul bandwidth usage.

Figure 7:
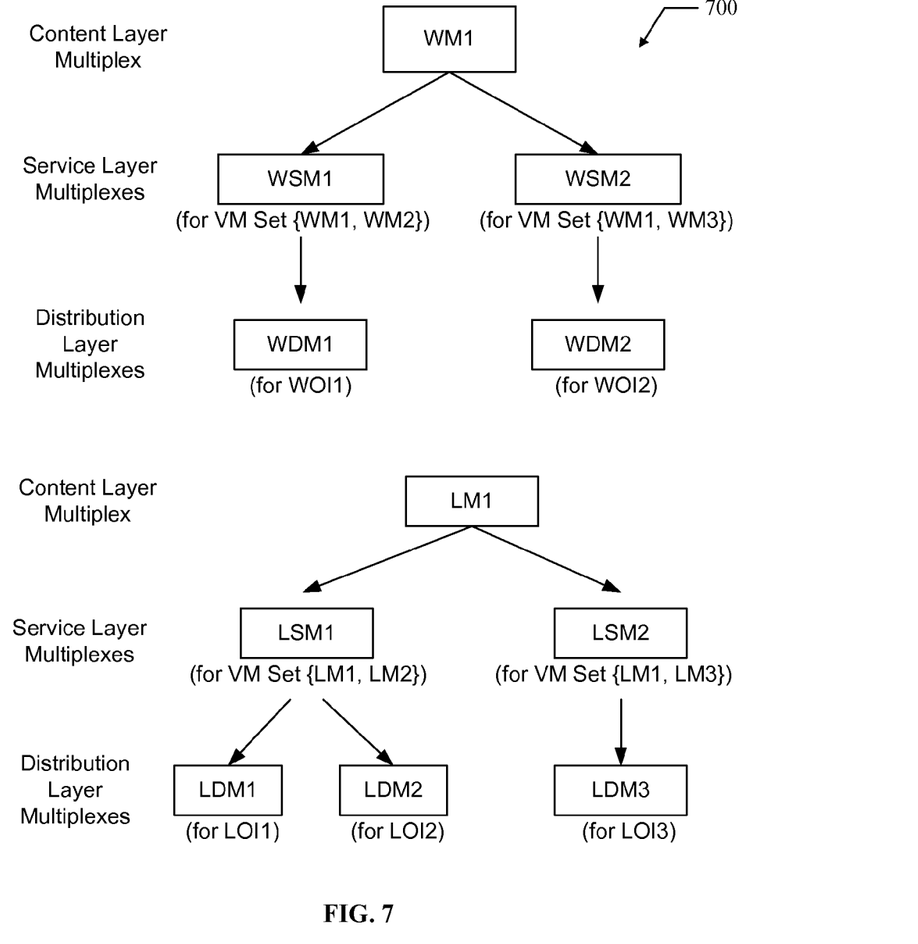
FIG. 7 shows an example illustrating the generation of service and distribution multiplexes based on the deployment captured in FIG. 1.

FIG. 7 shows an example illustrating the generation of service multiplexes and distribution multiplexes for the deployment captured in the network 100. In an aspect, the aggregation logic 404 operates to generate the service multiplexes and distribution multiplexes. The wide content multiplex WM1 is mapped to two different wide service multiplexes (WSM1 and WSM2) for two different wide VM sets associated with the content multiplex WM1. The WSM1 maps to a first wide distribution multiplex (WDM1) associated with WOI1 where associated VM set {WM1, WM2} is carried. The WSM2 maps to a second wide distribution multiplex (WDM2) associated with WOI2 where associated VM set {WM1, WM3} is carried. The local content multiplex LM1 is mapped to two different local service multiplexes (LSM1 and LSM2) for two different local VM sets associated with the content multiplex LM1. The LSM1 maps to two different local distribution multiplex (LDM1 and LDM1) associated with LOI1 and LOI2 respectively where associated VM set {LM1, LM2} is carried. The LSM2 maps to a third local distribution multiplex (LDM3) associated with LOI3 where associated VM set {LM1, LM3} is carried.

Figure 8:
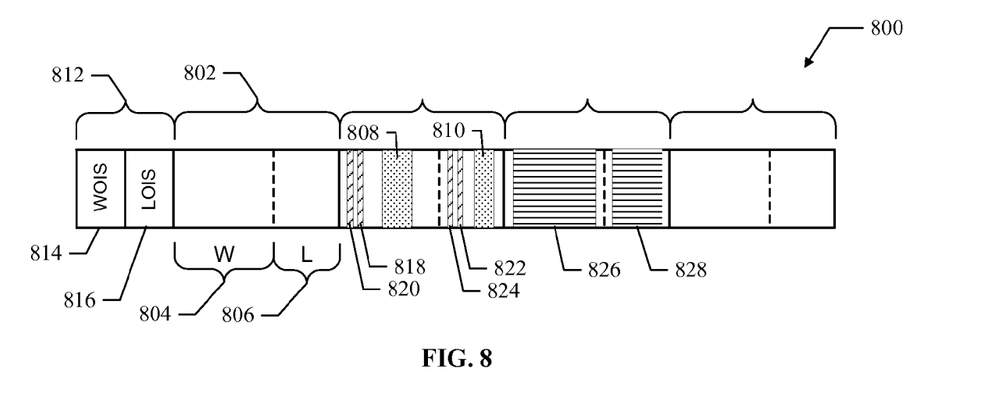
FIG. 8 shows a diagram of a transmission frame for use in aspects of a distribution system.

FIG. 8 shows a diagram of a transmission frame 800 for use in aspects of a distribution system. For example, the transmission frame 800 may be packed with distribution multiplexes and transmitted by one or more of the transmitter sites shown in FIG. 4.

The transmission frame 800 comprises four sub-frames, shown generally at 802, that are used to convey wide and local content. For example, each sub-frame 802 comprises a wide area partition 804 that is packed with wide area content, and a local area partition 806 that is packed with local area content.

Included in the wide area partition 804 is a wide area distribution layer multiplex 826. The wide area distribution layer multiplex 826 conveys wide area content and associated service and distribution overhead information to devices. Included in the local area partition 806 is a local area distribution multiplex 828. The local area distribution multiplex 828 conveys local area content and associated service and distribution overhead information to devices.

At the start of the transmission frame 800 are overhead information symbols (OIS) 812 that provide control information that is used to locate content and overhead information carried as part of wide area distribution multiplex 826 and local area distribution multiplex 828 in the sub-frames 802. The OIS 812 comprises a wide OIS portion 814 that contains control information for the wide area partition 804, and a local OIS portion 816 that contains control information for the local area partition 806.

In an aspect, the wide area partition 804 conveys wide content 808, service overhead 818 and a first portion of distribution overhead 820 that are associated with the wide area distribution multiplex 826. A second portion of the distribution overhead 820 is carried in the wide OIS 814. The local area partition 806 conveys local content 810, service overhead 822 and a first portion of distribution overhead 824 that are associated with the local area distribution multiplex 828. A second portion of the distribution overhead 824 is carried in the local OIS 816.

Figure 9:
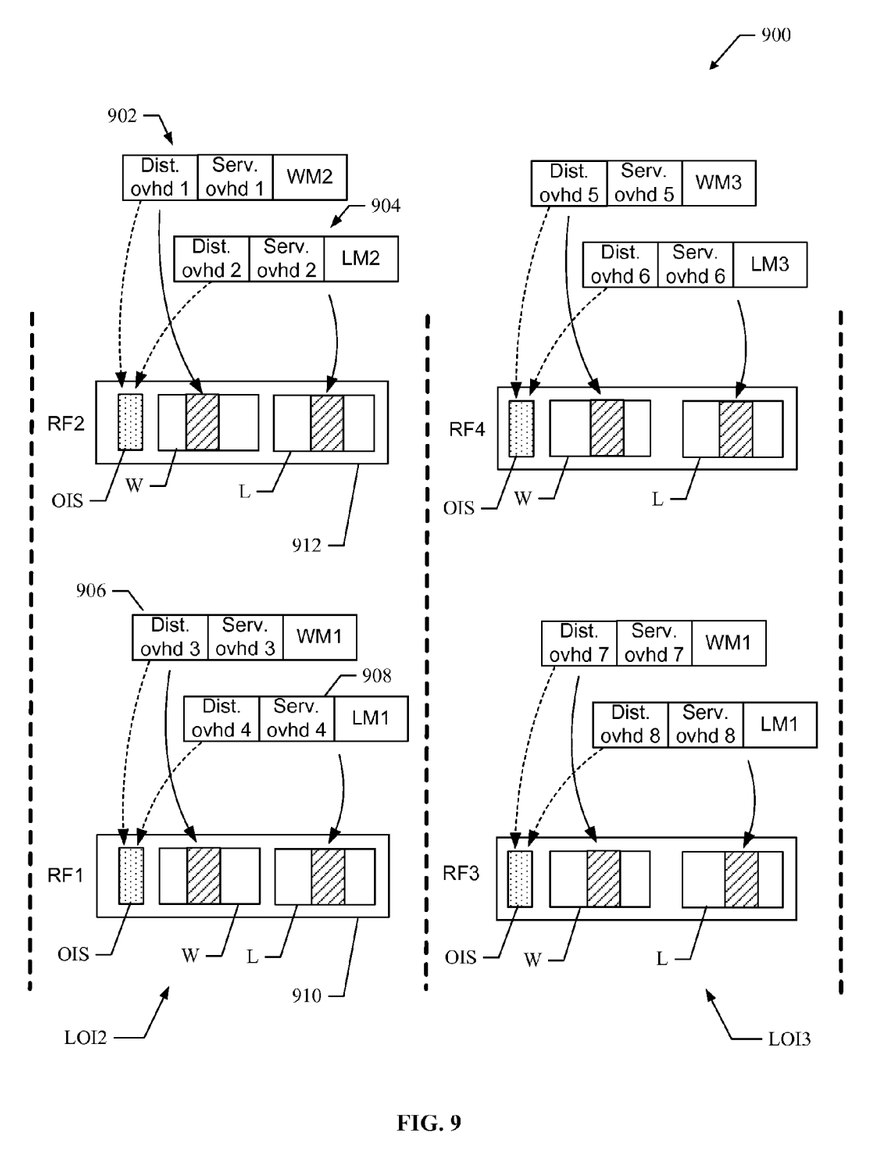
FIG. 9 shows a diagram that illustrates how distribution multiplexes are distributed within local operations infrastructures of a multi-frequency network in aspects of a distribution system.

FIG. 9 shows a diagram 900 that illustrates how distribution multiplexes are distributed within LOIs of a multi-frequency network in aspects of a distribution system. For example, the transmitter sites 406 408, 410, and 412 operate to distribute distribution multiplexes within the LOI2 and LOI3. In an aspect, each transmitter site operates to receive distribution multiplexes from the NOC 402. The distribution multiplexes comprises distribution overhead, service overhead and associated content data. Each transmitter obtains the appropriate components of distribution multiplex intended for its LOI and the distribution multiplex is then packed into transmission frames for transmission over the associated LOI on the assigned RF channel.

It will be assumed that the distribution multiplexes 902, 904, 906, and 908 comprise distribution overhead, service overhead and wide and local content multiplexes. Thus, the wide area multiplexes (WM1, WM2) comprise all the wide area content multiplexes that are to be distributed over the LOI2. The local area multiplexes (LM1, LM2) comprise all the local area multiplexes that are to be distributed over the LOI2.

The LOI2 comprises two RF channels (RF1, RF2) which are used to transmit transmission frames 910 and 912, respectively. Each transmission frame comprises an OIS, and wide (W) and local (L) data partitions. In the LOI2, the distribution multiplex 902 is distributed within the wide partition of the transmission frames 912. A part of the distribution overhead associated with wide distribution multiplex 902 is also distributed as part of the OIS. The distribution multiplex 904 is distributed within the local partition of the transmission frames 912. A part of the distribution overhead associated with local distribution multiplex 904 is also distributed as part of the OIS. A similar distribution is performed within the LOI2 with regards to the distribution multiplexes 906 and 908, which are distributed on RF1. It should be noted that each of the distribution multiplexes illustrated in FIG. 9 have different service overheads and distribution overheads.

Figure 10:
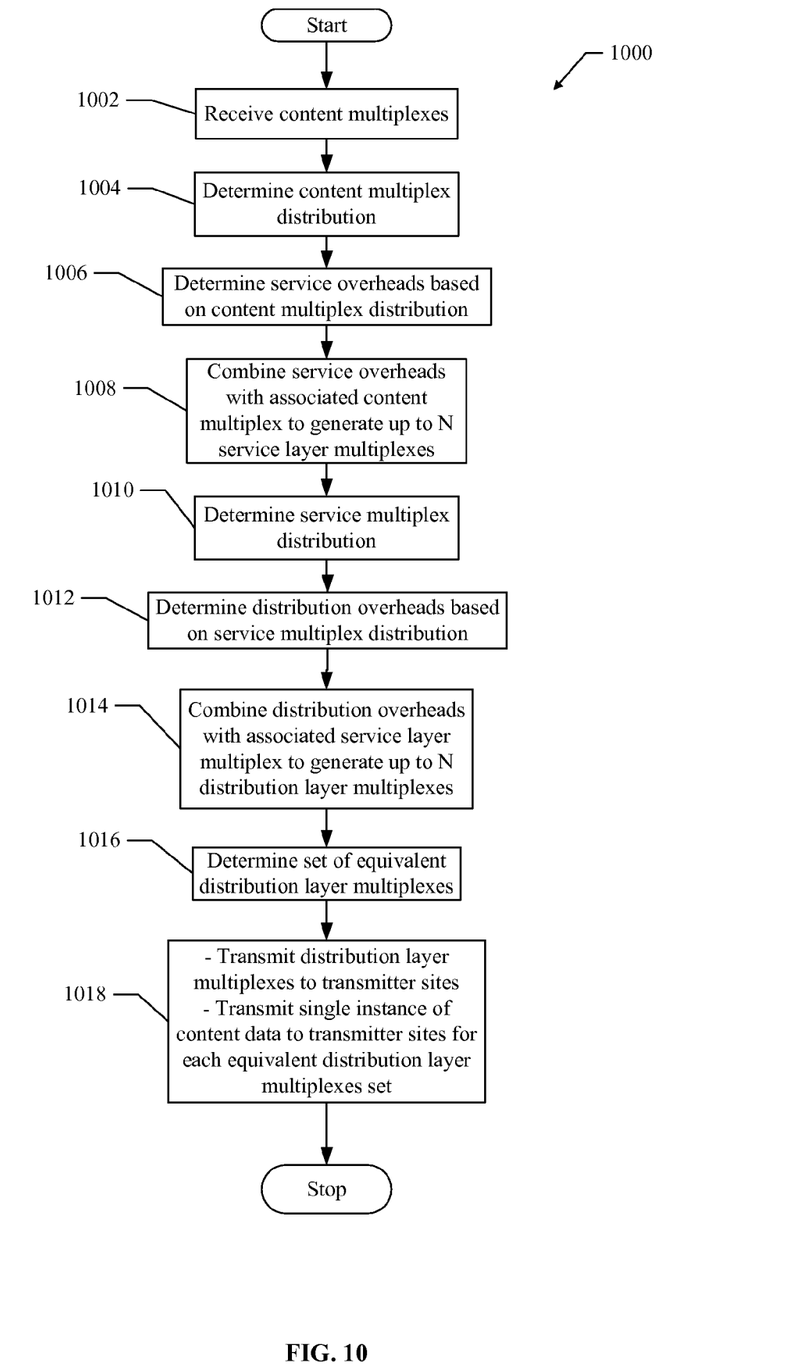
FIG. 10 shows a method for distributing content and associated overhead for use in aspects of a distribution system.

FIG. 10 shows a method 1000 for use in aspects of a distribution system. For clarity, the method 1000 is described herein with reference to the aggregation logic 500 shown in FIG. 5. For example, in an aspect, the combining logic 502 executes one or more sets of codes to control the aggregation logic 500 to perform the functions described below.

At block 1002, one or more wide and/or local content multiplexes are received for distribution over a multi-frequency network. For example, the multiplexes are received at the NOC 402 shown in FIG. 4.

At block 1004, the distribution of the content multiplexes is determined. For example, the combining logic 502 operates to determine the distribution of the wide area and local area content multiplexes to selected WOIs and LOIs.

At block 1006, one or more service overheads are determined for each content multiplex based on the content multiplex distribution information over WOIs and LOIs. For example, the combining logic 502 operates to determine one or more service overheads for each content multiplex based on the distribution of associated content multiplex to WOIs and LOIs.

At block 1008, service multiplexes are generated from the content layer multiplexes. For example, the combining logic 502 operates to combine one or more service overheads with associated content multiplex to generate one or more service layer multiplexes for that content multiplex.

At block 1010, the distribution of the service layer multiplexes is determined. For example, the combining logic 502 operates to determine the distribution of the wide area and local service multiplexes to selected WOIs and LOIs.

At block 1012, one or more distribution overheads are determined for each content multiplex based on the service multiplex distribution information over WOIs and LOIs. For example, the combining logic 502 operates to determine one or more distribution overheads for each service multiplex based on the distribution of associated service multiplex to WOIs and LOIs.

At block 1014, the service layer multiplexes are combined with distribution overheads to generate distribution layer multiplexes. For example, the combining logic 502 operates to combine each service multiplex with one or more associated distribution overheads to produce one or more distribution layer multiplexes.

At block 1016, one or more sets of equivalent distribution layer multiplexes are identified. For example, equivalent distribution layer multiplex set comprise all those distribution layer multiplexes which carry same content data but different service overheads and/or distribution overheads. In an aspect, the combining logic 502 operates to identify sets of equivalent distribution multiplexes.

At block 1018, the distribution layer multiplexes are transmitted to transmitter sites for distribution over a multi-frequency network. For example, the distribution layer multiplexes are output from the output logic 508 for transport from the NOC 402 to the transmitter sites using any suitable transport mechanism. Different components of distribution layer multiplexes (content data, service overhead and distribution overhead) are assigned transport identifiers for transmission to the transmitter sites. In an aspect, the output logic 508 transmits a single instance of content data to transmitter sites for each set of equivalent distribution multiplexes to optimize backhaul bandwidth usage.

Thus, the method 1000 operates to provide aspects of a distribution system. It should be noted that the method 1000 represents just one implementation and that other implementations are possible within the scope of the aspects.

Figure 11:
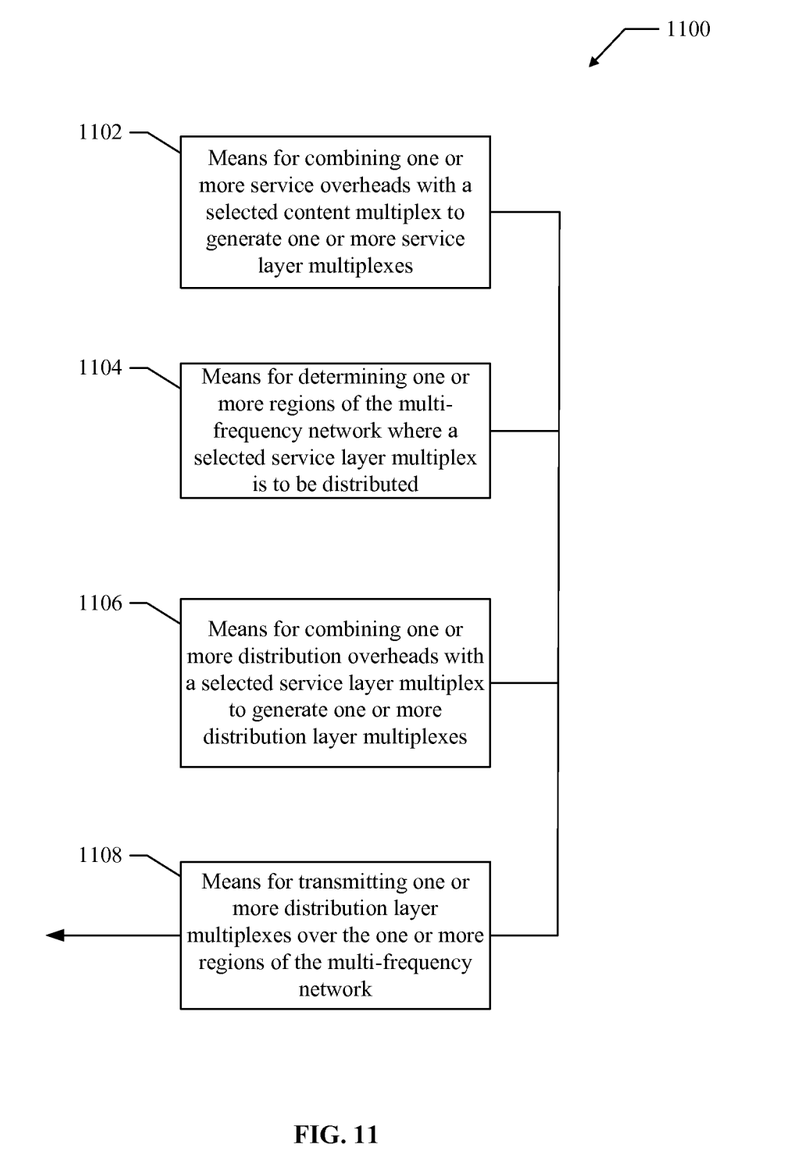
FIG. 11 shows exemplary aggregation logic for use in aspects of a distribution system.

FIG. 11 shows aggregation logic 1100 for use in aspects of a distribution system. For example, the aggregation logic 1100 is suitable for use as the aggregation logic 500 shown in FIG. 5. In an aspect, the aggregation logic 1100 is implemented by one or more modules comprising at least one processor configured to provide aspects of a distribution system as described herein. For example, in an aspect, each module comprises hardware and/or hardware executing software.

The aggregation logic 1100 comprises a first module comprising means (1102) for combining one or more service overheads with a selected content multiplex to generate one or more service layer multiplexes, respectively, which in an aspect comprises the combining logic 502. The aggregation logic 1100 also comprises a second module comprising means (1104) for determining one or more regions of the multi-frequency network where a selected service layer multiplex is to be distributed, which in an aspect comprises the combining logic 502. The aggregation logic 1100 also comprises a third module comprising means (1106) for combining one or more distribution overheads with the selected service layer multiplex to generate one or more distribution layer multiplexes, respectively, wherein the one or more distribution overheads are based on the one or more regions, respectively, which in an aspect comprises the combining logic 502. The aggregation logic 1100 also comprises a fourth module comprising means (1108) for transmitting the one or more distribution layer multiplexes over the one or more regions of the multi-frequency network, which in an aspect comprises the output logic 508.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a distribution system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for multiplex distribution in a wireless broadcast network, the method comprising:
combining one or more service overheads with a selected content multiplex to generate one or more service layer multiplexes;
determining one or more regions of the wireless broadcast network where a selected service layer multiplex of the generated service layer multiplexes is to be distributed;
combining one or more distribution overheads with the selected service layer multiplex to generate one or more distribution layer multiplexes, wherein the one or more distribution overheads are determined based on the one or more regions; and
transmitting the one or more distribution layer multiplexes over the one or more regions of the wireless broadcast network such that the selected content multiplex is broadcast with different overhead information for each different region.

2. The method of claim 1, further comprising:
determining one or more selected regions of the multi-frequency network where the selected content multiplex is to be distributed; and
determining the one or more service overheads based on the one or more selected regions, respectively.

3. The method of claim 1, further comprising:
generating service layer multiplexes for a plurality of content multiplexes; and
generating distribution layer multiplexes for a plurality of service layer multiplexes.

4. The method of claim 3, further comprising:
generating separate service layer multiplexes for wide content multiplexes and local content multiplexes, respectively; and
generating separate distribution layer multiplexes for wide service layer multiplexes and local service layer multiplexes, respectively.

5. The method of claim 1, wherein said transmitting comprises:
assigning a transport identifier to each component of the one or more distribution layer multiplexes, and
transmitting each component of the one or more distribution layer multiplexes to transmitter sites associated with the one or more regions of the multi-frequency network using a transport mechanism and the associated transport identifiers.

6. The method of claim 1, wherein said transmitting comprises:
identifying one or more sets of equivalent distribution layer multiplexes, wherein each distribution layer multiplex in a selected set of equivalent distribution layer multiplexes is associated with identical content data; and
transmitting a single instance of content data to transmitter sites for all distribution layer multiplexes in the selected set of equivalent distribution layer multiplexes.

7. An apparatus for multiplex distribution in a wireless broadcast network, the apparatus comprising:
combining logic configured to:
combine one or more service overheads with a selected content multiplex to generate one or more service layer multiplexes;
determine one or more regions of the wireless broadcast network where a selected service layer multiplex of the generated service layer multiplexes is to be distributed;
combine one or more distribution overheads with the selected service layer multiplex to generate one or more distribution layer multiplexes; wherein the one or more distribution overheads are determined based on the one or more regions; and
output logic configured to transmit the one or more distribution layer multiplexes over the one or more regions of the wireless broadcast network such that the selected content multiplex is broadcast with different overhead information for each different region.

8. The apparatus of claim 7, wherein the combining logic is configured to:
determine one or more selected regions of the wireless broadcast network where the selected content multiplex is to be distributed; and
determine the one or more service overheads based on the one or more selected regions, respectively.

9. The apparatus of claim 7, wherein said combining logic is configured to:
generate service layer multiplexes for a plurality of content multiplexes; and
generate distribution layer multiplexes for a plurality of service layer multiplexes.

10. The apparatus of claim 9, wherein said combining logic is configured to:
generate separate service layer multiplexes for wide content multiplexes and local content multiplexes, respectively; and
generate separate distribution layer multiplexes for wide service layer multiplexes and local service layer multiplexes, respectively.

11. The apparatus of claim 7, wherein said output logic is configured to:
assign a transport identifier to each component of the one or more distribution layer multiplexes, and
transmit each component of the one or more distribution layer multiplexes to transmitter sites associated with the one or more regions of the wireless broadcast network using a transport mechanism and the associated transport identifiers.

12. The apparatus of claim 7, wherein said output logic is configured to:
identify one or more sets of equivalent distribution layer multiplexes, wherein each distribution layer multiplex in a selected set of equivalent distribution layer multiplexes is associated with identical content data; and
transmit a single instance of content data to transmitter sites for all distribution layer multiplexes in the selected set of equivalent distribution layer multiplexes.

13. An apparatus for multiplex distribution in a wireless broadcast network, the apparatus comprising:
means for combining one or more service overheads with a selected content multiplex to generate one or more service layer multiplexes;
means for determining one or more regions of the wireless broadcast network where a selected service layer multiplex of the generated service layer multiplexes is to be distributed;
means for combining one or more distribution overheads with the selected service layer multiplex to generate one or more distribution layer multiplexes; wherein the one or more distribution overheads are determined based on the one or more regions; and means for transmitting the one or more distribution layer multiplexes over the one or more regions of the wireless broadcast network such that the selected content multiplex is broadcast with different overhead information for each different region.

14. The apparatus of claim 13, further comprising:
means for determining one or more selected regions of the wireless broadcast network where the selected content multiplex is to be distributed; and
means for determining the one or more service overheads based on the one or more selected regions.

15. The apparatus of claim 13, further comprising:
means for generating service layer multiplexes for a plurality of content multiplexes; and
means for generating distribution layer multiplexes for a plurality of service layer multiplexes.

16. The apparatus of claim 15, further comprising:
means for generating separate service layer multiplexes for wide content multiplexes and local content multiplexes, respectively; and
means for generating separate distribution layer multiplexes for wide service layer multiplexes and local service layer multiplexes, respectively.

17. The apparatus of claim 13, wherein said means for transmitting comprises:
means for assigning a transport identifier to each component of the one or more distribution layer multiplexes, and
means for transmitting each component of the one or more distribution layer multiplexes to transmitter sites associated with the one or more regions of the wireless broadcast network using a transport mechanism and the associated transport identifiers.

18. The apparatus of claim 13, wherein said means for transmitting comprises:
means for identifying one or more sets of equivalent distribution layer multiplexes, wherein each distribution layer multiplex in a selected set of equivalent distribution layer multiplexes is associated with identical content data; and
means for transmitting a single instance of content data to transmitter sites for all distribution layer multiplexes in the selected set of equivalent distribution layer multiplexes.

19. A computer program product for multiplex distribution in a wireless broadcast network, comprising:
a non-transitory machine-readable medium comprising:
a first set of codes for causing a computer to combine different one or more service overheads with a selected content multiplex to generate one or more service layer multiplexes;
a second set of codes for causing the computer to determine one or more regions of the wireless broadcast network where a selected service layer multiplex of the generated service layer multiplexes is to be distributed;
a third set of codes for causing the computer to combine one or more distribution overheads with the selected service layer multiplex to generate one or more distribution layer multiplexes;
wherein the one or more distribution overheads are determined based on the one or more regions; and
a fourth set of codes for causing the computer to transmit the one or more distribution layer multiplexes over the one or more regions of the wireless broadcast network such that the selected content multiplex is broadcast with different overhead information for each different region.

20. The machine-readable medium of claim 19, wherein said first set of codes are configured to cause the computer to:
determine one or more selected regions of the wireless broadcast network where the selected content multiplex is to be distributed; and
determine the one or more service overheads based on the one or more selected regions.

21. The machine-readable medium of claim 19, wherein said first set of codes are configured to cause the computer to generate service layer multiplexes for a plurality of content multiplexes.

22. The machine-readable medium of claim 19, wherein said third set of codes are configured to cause the computer to generate distribution layer multiplexes for a plurality of service layer multiplexes.

23. The machine-readable medium of claim 21, wherein said first set of codes are configured to cause the computer to generate separate service layer multiplexes for wide content multiplexes and local content multiplexes, respectively.

24. The machine-readable medium of claim 22, wherein said third set of codes are configured to cause the computer to generate separate distribution layer multiplexes for wide service layer multiplexes and local service layer multiplexes, respectively.

25. The machine-readable medium of claim 19, wherein said fourth set of codes are configured to cause the computer to:
assign a transport identifier to each component of the one or more distribution layer multiplexes, and
transmit each component of the one or more distribution layer multiplexes to transmitter sites associated with the one or more regions of the wireless broadcast network using a transport mechanism and the associated transport identifiers.

26. The machine-readable medium of claim 19, wherein said fourth set of codes are configured to cause the computer to:
identify one or more sets of equivalent distribution layer multiplexes, wherein each distribution layer multiplex in a selected set of equivalent distribution layer multiplexes is associated with identical content data; and
transmit a single instance of content data for all distribution layer multiplexes in the selected set of equivalent distribution layer multiplexes.

27. At least one integrated circuit configured for multiplex distribution in a wireless broadcast network, the at least one integrated circuit comprising:
a first module for combining one or more service overheads with a selected content multiplex to generate one or more service layer multiplexes;
a second module for determining one or more regions of the wireless broadcast network where a selected service layer multiplex of the generated service layer multiplexes is to be distributed;
a third module for combining one or more distribution overheads with the selected service layer multiplex to generate one or more distribution layer multiplexes; wherein the one or more distribution overheads are determined based on the one or more regions; and
a fourth module for transmitting the distribution layer multiplexes over the one or more regions of the wireless broadcast network such that the selected content multiplex is broadcast with different overhead information for each different region.

28. The at least one integrated circuit of claim 27, wherein said first module is configured for:

determining one or more selected regions of the wireless broadcast network where the selected content multiplex is to be distributed; and determining the one or more service overheads based on the one or more selected regions, respectively.

29. The at least one integrated circuit of claim 27, wherein said first module is configured for generating service layer multiplexes for a plurality of content multiplexes.

30. The at least one integrated circuit of claim 27, wherein said third module is configured for generating distribution layer multiplexes for a plurality of service layer multiplexes.

31. The at least one integrated circuit of claim 29, wherein said first module is configured for generating separate service layer multiplexes for wide content multiplexes and local content multiplexes, respectively.

32. The at least one integrated circuit of claim 30, wherein said third module is configured for generating separate distribution layer multiplexes for wide service layer multiplexes and local service layer multiplexes, respectively.

33. The at least one integrated circuit of claim 27, wherein said fourth module is configured for:
assigning a transport identifier to each component of the one or more distribution layer multiplexes, and
transmitting each component of the one or more distribution layer multiplexes to transmitter sites associated with the one or more regions of the wireless broadcast network using a transport mechanism and the associated transport identifiers.

34. The at least one integrated circuit of claim 27, wherein said fourth module is configured for:
identifying one or more sets of equivalent distribution layer multiplexes, wherein each distribution layer multiplex in a selected set of equivalent distribution layer multiplexes is associated with identical content data; and
transmitting a single instance of content data to transmitter sites for all distribution layer multiplexes in the selected set of equivalent distribution multiplexes.

* * * * *